Patented June 26, 1923.

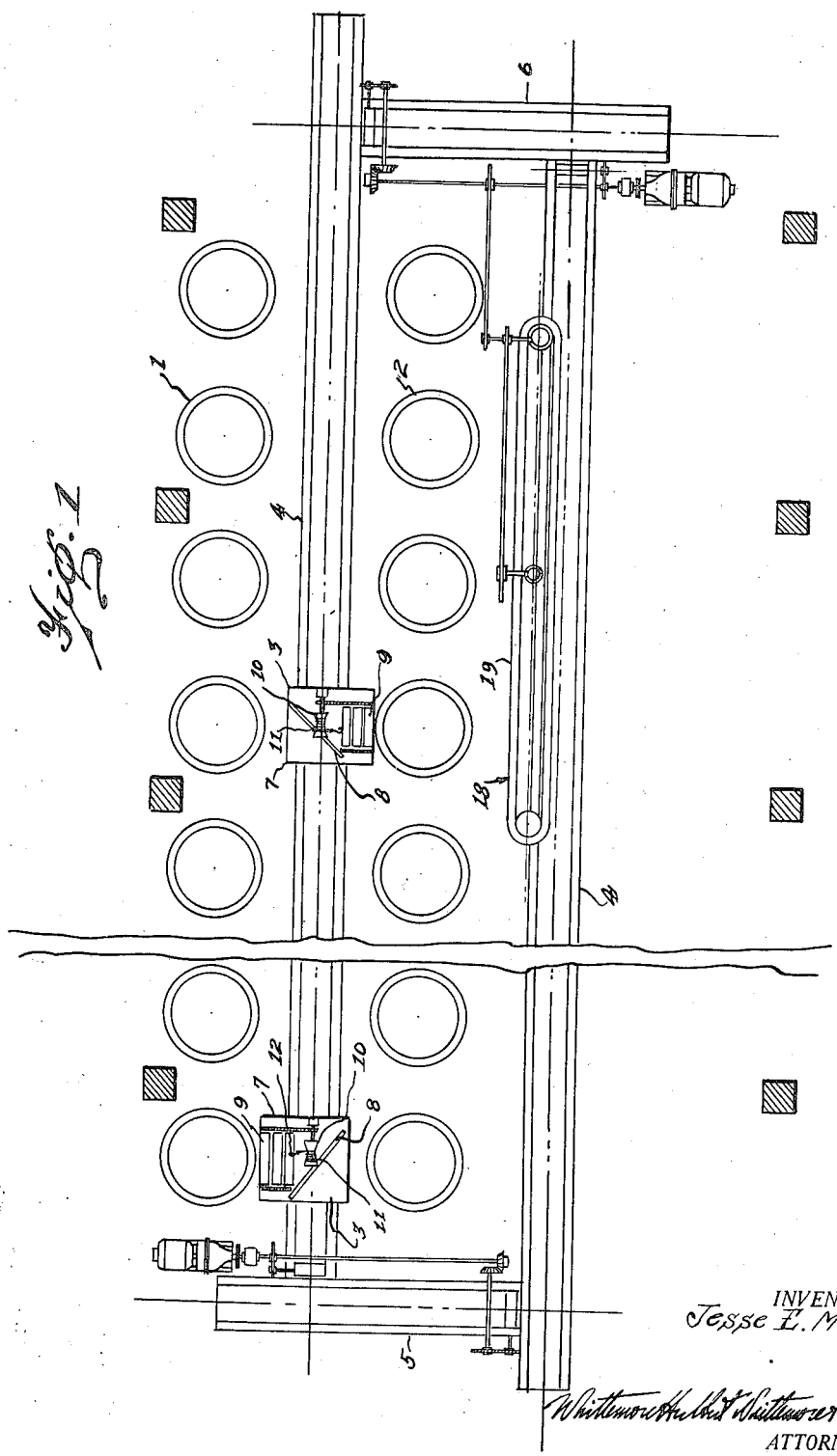

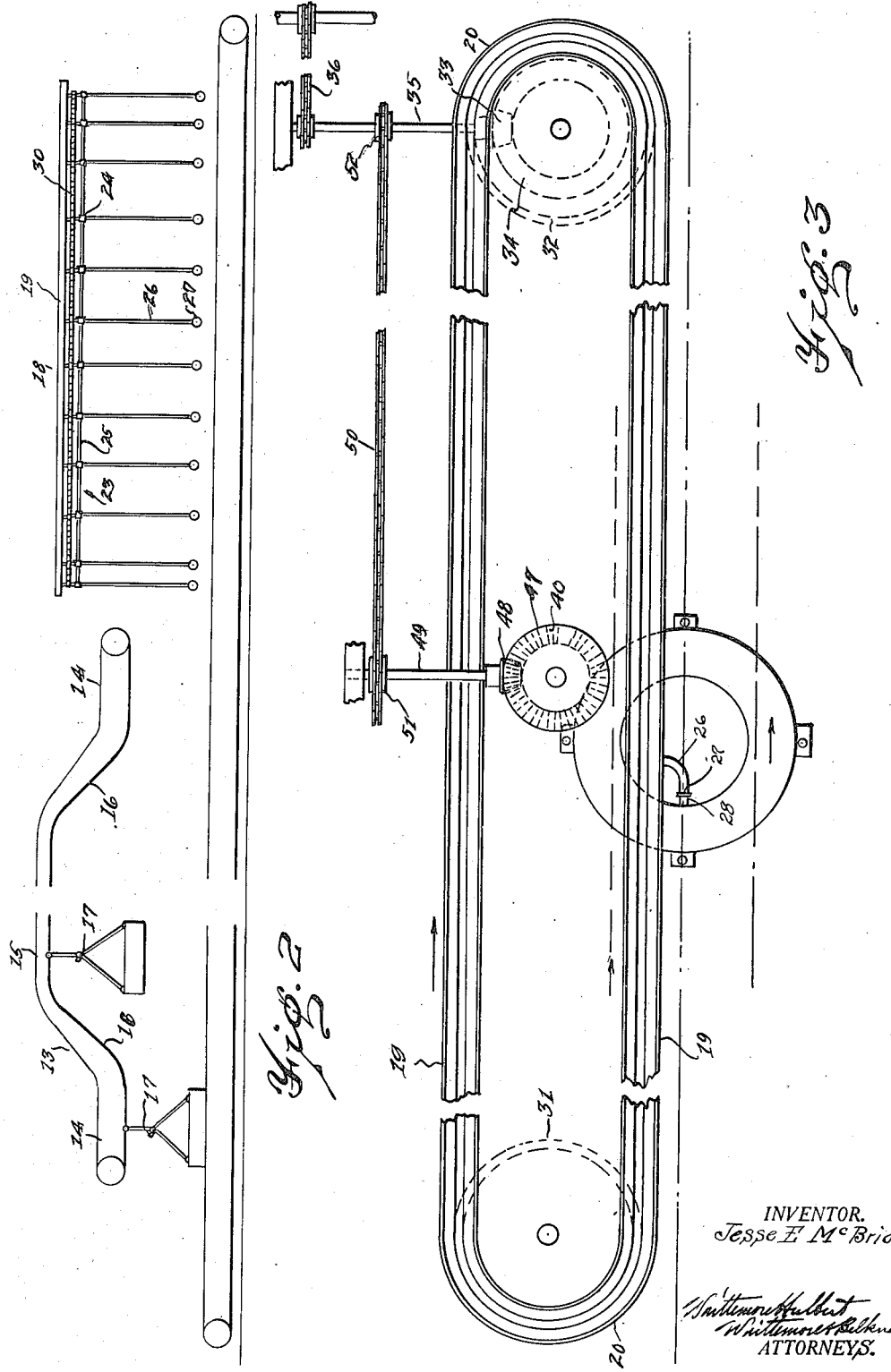

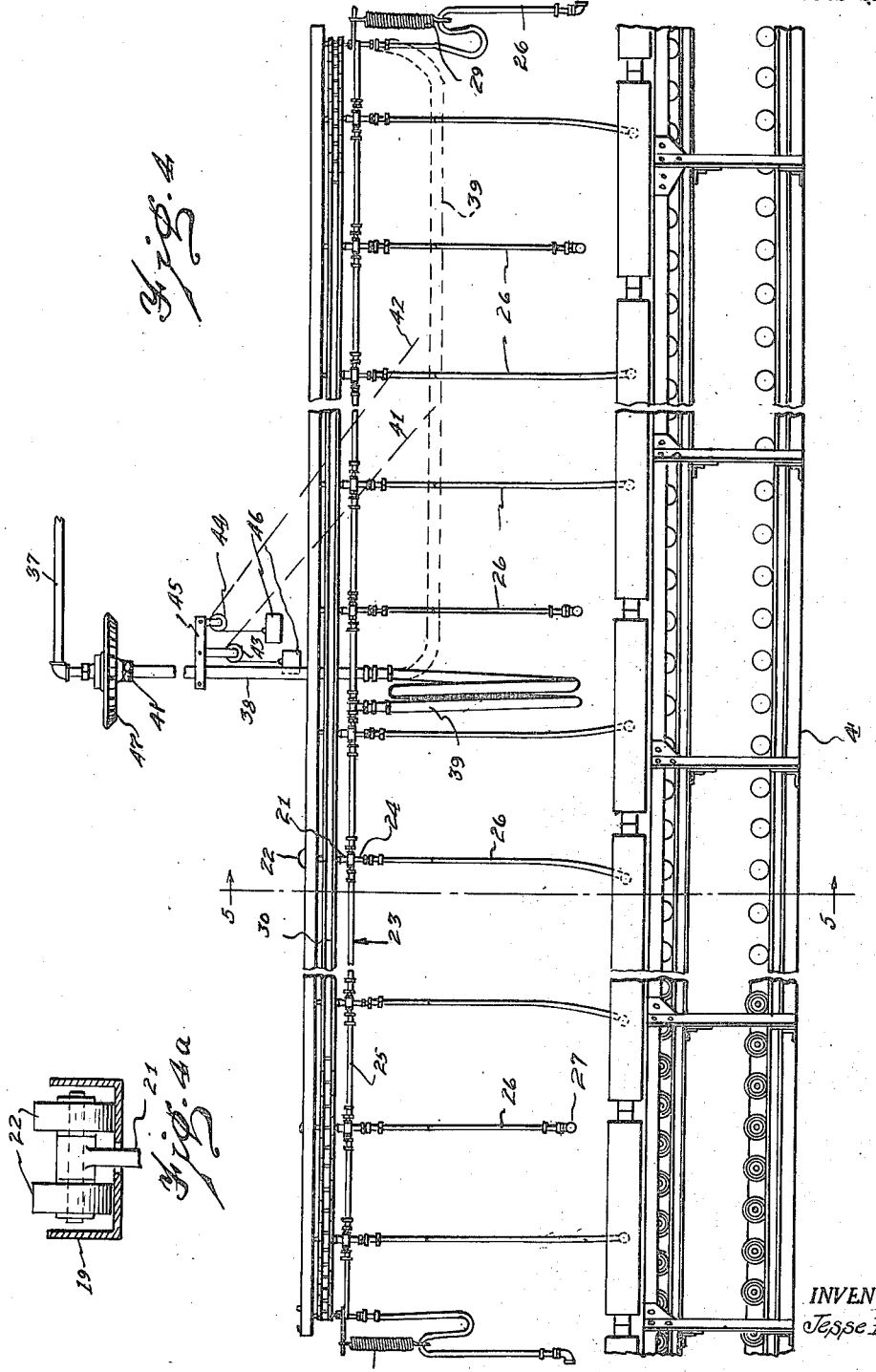

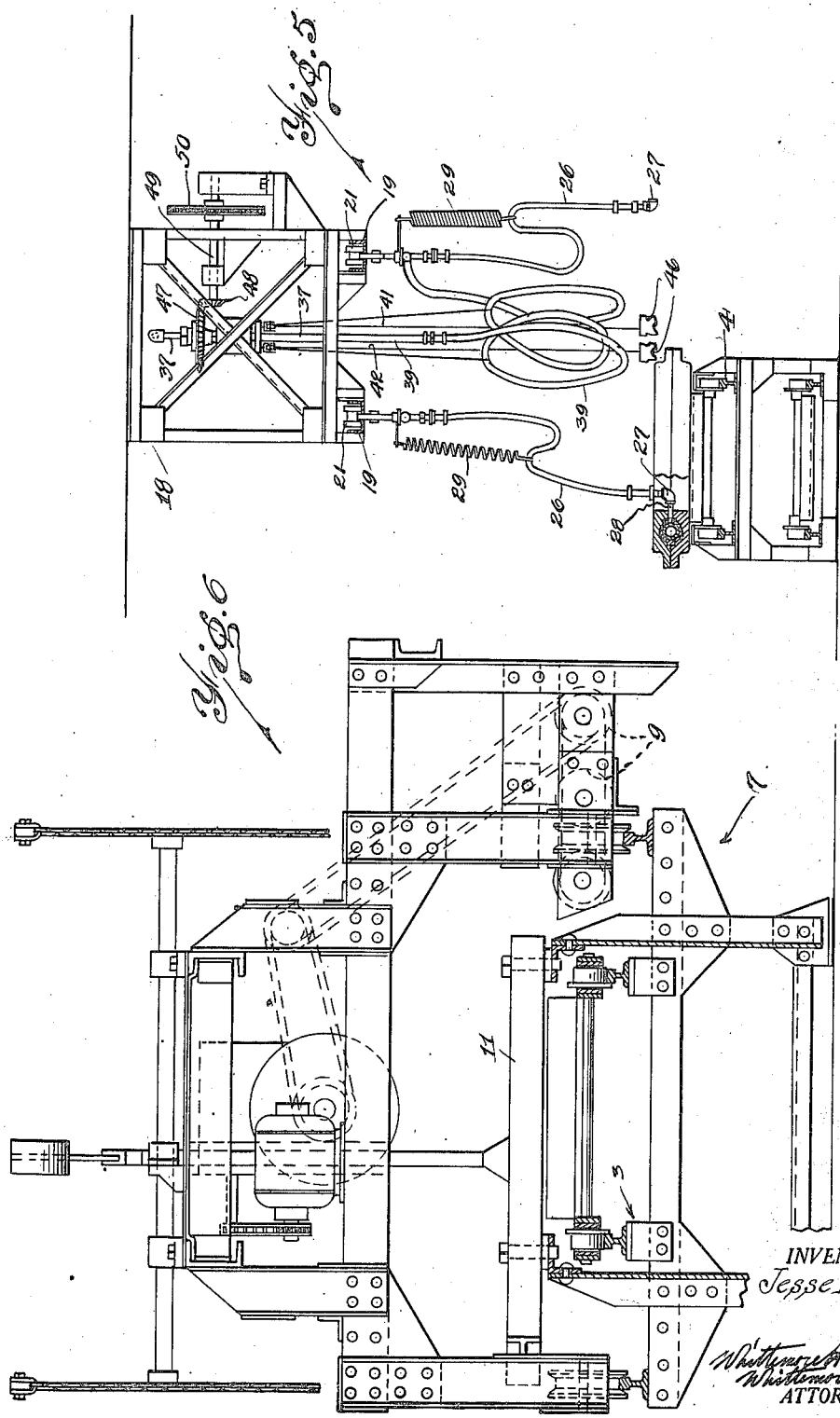

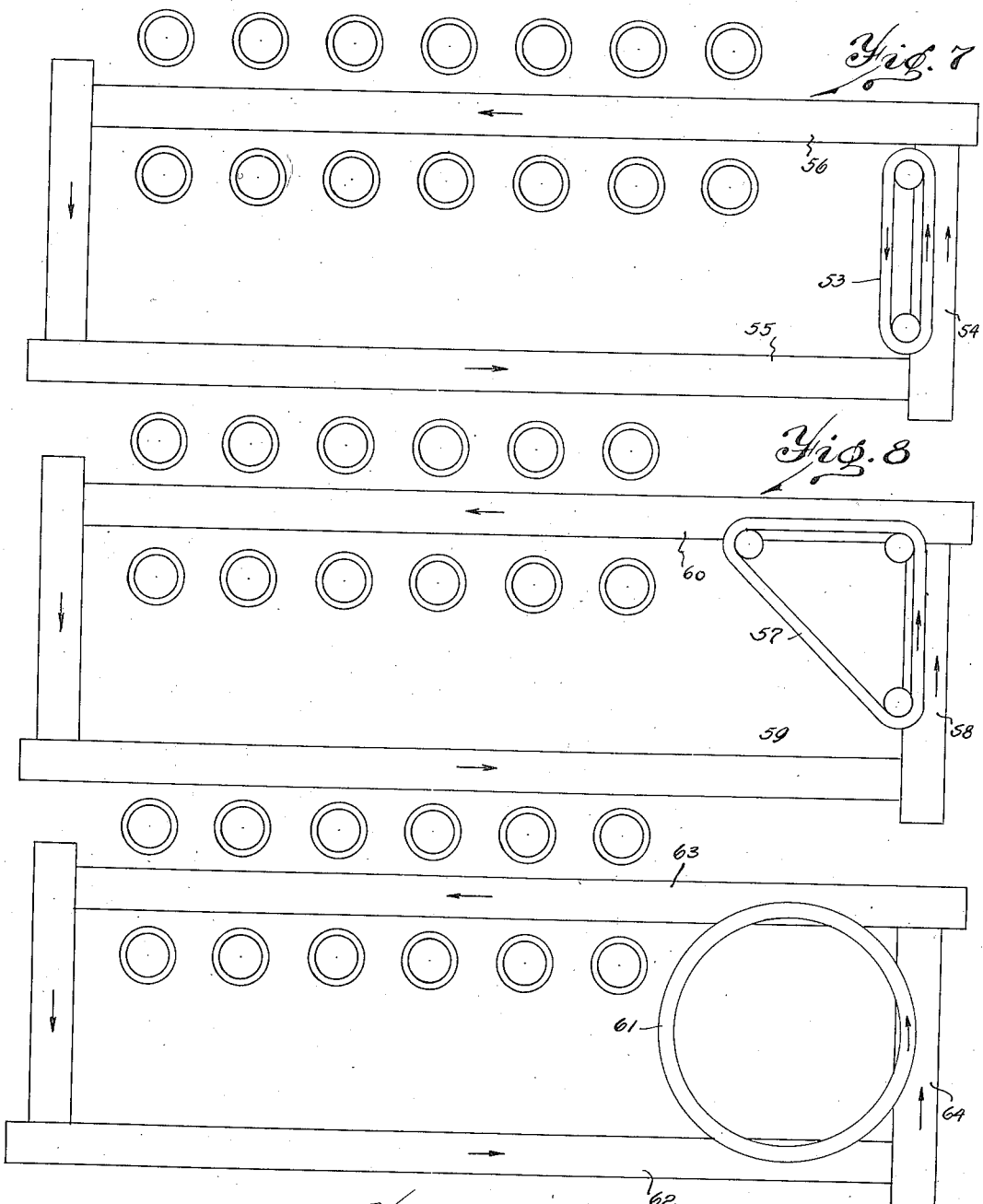

1,459,916

UNITED STATES PATENT OFFICE.

JESSE E. McBRIDE, OF DETROIT, MICHIGAN, ASSIGNOR TO PALMER-BEE COMPANY, OF DETROIT, MICHIGAN, A CORPORATION OF MICHIGAN.

CONVEYING SYSTEM.

Application filed November 21, 1921. Serial No. 516,564.

*To all whom it may concern:*

Be it known that I, JESSE E. McBRIDE, a citizen of the United States of America, residing at Detroit, in the county of Wayne and State of Michigan, have invented certain new and useful Improvements in Conveying Systems, of which the following is a specification, reference being had therein to the accompanying drawings.

The invention relates to conveying systems and is applicable particularly in the manufacture of automobile tires in which sectional molds are carried on continuously moving conveyors to and from a series of heaters of vulcanizers and during their travel are separated to permit of removing the cured tires and inserting green tires. In the manufacture of cord tires, each tire after it has been built is fitted with an expansible core or inner tube made extra heavy of special construction and called an air bag, the latter containing air at sufficient pressure to hold its shape. This tire with the core is then placed in the lower section of the mold on the work conveyor after the cured tire has been removed, and then the upper and lower sections of the mold are brought into registration and bolted together. It is then necessary to inflate the core with sufficient pressure to stretch the cord fabric and to cause the green or soft rubber on the tread to fill the tread design in the mold sections. This pressure varies, but is usually between 100 and 200 pounds per square inch.

Heretofore it has been necessary to apply the air pressure to the molds while they are stationary, but with my invention, the molds are inflated while in motion, thereby increasing the production and at the same time decreasing the length of the conveying apparatus and saving a decided amount of floor space.

With this object in view as well as others, the invention resides in the novel features and combinations and arrangements of parts as more fully hereinafter set forth.

In the drawings:

Figure 1 is a plan view of a conveying system embodying my invention;

Figure 2 is a side elevation thereof;

Figure 3 is a plan view of the apparatus for inflating the molds while in motion;

Figure 4 is a side elevation thereof;

Figure 5 is a cross section on the line 5—5 of Figure 4,

Figure 6 is a cross section on the line 6—6 of Figure 1.

Figures 7, 8 and 9 are diagrammatic elevations of modified conveying systems.

1 and 2 are parallel series of heaters or vulcanizers in which the tires are cured. The conveying system comprises the loading and unloading conveyor 3 extending between the heaters 1 and 2 and adjacent thereto, the work conveyor 4 extending parallel to the loading and unloading conveyor and the connecting end conveyors 5 and 6, these conveyors being preferably of the platform type. The loading and unloading conveyor 3 carries the molds containing green tires to the heaters 1 and 2 and carries the molds containing cured tires from these heaters and for transferring the molds from this conveyor to the heaters and from the heaters to the conveyor there are the combined loading and unloading devices 7 which as shown particularly in Figure 6 straddle the conveyor 3 and are mounted upon the framework 4 of this conveyor to be movable longitudinally thereof.

These loading and unloading devices each have a deflecting or shearing bar 8 which extends diagonally of the loading and unloading conveyor and is adapted to be lowered to a position adjacent the upper surface of the conveyor to engage the molds travelling on the conveyor and to deflect the same laterally therefrom onto a series of power driven rolls 9, which substantially fill the gap between the conveyor and the adjacent heater and the upper surfaces of which are substantially level with the upper surfaces of the conveyor and heater. To transfer the molds from the heaters to the loading and unloading conveyor, each loading and unloading device is provided with a power driven drum 10 around which may be wound a cable 11 having a suitable hook 12 at one end for engaging the molds.

13 is a cover conveyor above the work conveyor 4, which has the two end portions 14 at one level and the intermediate portion 15 at a higher level, the end and intermediate portions being connected by the inclined portions 16. This cover conveyor is provided with suitable means such as the hooks 17 for carrying the upper sections of the molds and raising the same above the lower sections, holding these sections in spaced relation with respect to the lower sections while the cured tires are being removed from the lower sections and the green or soft tires fitted upon expansible cores are being inserted therein and then lowering the upper sections into registration with their respective lower sections, the cover conveyor being continuously moved in timed relation to the work conveyor so that the upper sections of the molds when lowered can be re-engaged with their respective lower sections and secured to each other preferably by being bolted together.

18 is an inflation conveyor located at a height above the front portion of the work conveyor 4 and preferably slightly to the inner side of the center line of this conveyor. The inflation conveyor may also be located directly over or to the outer side of the center line of the conveyor if found convenient or necessary. In detail, this inflation conveyor comprises the track having the parallel sides 19 connected by the semi-circular ends 20, one of the sides being parallel to the work conveyor. The inflation conveyor also comprises the hangers 21 having the trolley wheels 22 at their upper ends which are supported upon the track. 23 is a continuous hose main carried upon the hangers 21 and having intermediate the T-shaped hose fittings 24 secured to the hangers, the flexible hose sections 25 which are clamped around the ends of the heads of the T's and communicate with each other therethrough. With this arrangement, the flexible hose sections permit of the hose main travelling with the hangers in conformation to the curvature of the track upon which the trolley wheels 22 are supported. 26 are a series of hose conductors clamped around the lower ends of the stems of the T fittings and depending therefrom, these conductors being in communication with the hose main through the stems of the T fittings. 27 are automatic air valves upon the lower ends of the hose conductors 26 which are adapted to be detachably secured to the valve stems 28 of the mold cores which valve stems extend through the inner peripheries of the molds as shown particularly in Figure 5. The depending hose conductors 26 are held above and out of engagement with the molds upon the work conveyor by being hung up out of the way by hand or by means of the counter weights or coil springs, this means in the present instance being the coil springs 29 supported from the hangers 21 but are of sufficient length so that when it is desired to connect the automatic air valves 27 to the valve stems 28, this can be accomplished by manually pulling down upon the hose conductors and stretching the coil springs. There are preferably a greater number of hose conductors 26 than molds upon the conveyor so that the man at the rear end of the inflation apparatus whose duty it is to connect the automatic air valves of the hose conductors to the valve stems may select one of a plurality of hose conductors. Furthermore, it is not necessary to regularly space the molds upon the work conveyor nor to position the valve stems. The automatic air valves of the hose conductors are preferably manually disconnected from the valve stems at their forward limit of travel, the connection having been of sufficient duration to properly inflate the core.

The inflation conveyor is moved in timed relation to the work conveyor so that the depending hose conductors travel at approximately the same rate of speed as the molds upon the work conveyor. As shown, 30 is a conveyor chain connected to the hangers 21 and passing around the sprocket wheels 31 and 32. The latter is driven by suitable means such as the bevelled pinion 33 engaging the bevelled gear wheel 34 and fixed upon the shaft 35 which is driven by suitable connections 36 leading to the driving mechanism for the work conveyor.

37 is an air supply pipe line connected to a suitable source of air pressure and also connected to the hose main 23 by means of the vertical pipe section 38 and the hose feeder line 39. 40 is a swivel joint connecting the vertical pipe section 38 to the air supply pipe line and permitting of rotation of the pipe section, which latter is located centrally of the inflation conveyor. The hose feeder line 39 is of sufficient length so that it will extend from the pipe section 38 to the extreme ends of the hose main and to hold this hose feeder line above the level of the molds regardless whether it is in extended or retracted position, there are preferably the cables 41 and 42 connected to intermediate portions of the hose feeder line and passing over the sheaves 43 and 44 respectively, journalled in the bracket 45 secured to the vertical pipe section 38, the opposite ends of these cables being connected to suitable weights 46. With this arrangement, the hose feeder line naturally forms in loops when in retracted position or in other words, when the end of the hose feeder line connected to the hose main is adjacent to the pipe section 38. It is evident that other supporting means for the hose feeder line may be used, as for example a suitable table. Also the supporting means may be dispensed with by limiting the length of the hose feeder line.

To remove the strain from the hose feeder line in travelling around with the hose main, the lower part of the swivel joint 40 has preferably secured thereto a bevelled gear wheel 47 which is driven in timed relation to the rotation of the hose main 23 by means of the bevelled pinion 48 upon the shaft 49 which shaft is driven from the shaft 35 by suitable drive chain 50 passing over the sprocket wheels 51 and 52 respectively, upon the shafts 49 and 35.

Since there is a certain amount of time required and consequently a certain length of work conveyor required in separating the mold sections, removing the cured tires, cleaning the molds and inserting the green tires, and since there is a certain amount of time required and consequently a certain length of work conveyor required for bolting the mold sections to each other, after they have been re-engaged, the inflation conveyor may be located in a more convenient portion of the conveying system, dependent upon the length of the loading and unloading conveyor as compared to the length of the series of heaters, or dependent upon the length of the cross conveyor at the forward end of the work conveyor.

In the modified construction of conveyor system shown in Figure 7 the tire inflation conveyor 53 is located above the end conveyor 54 connecting the forward end of the work conveyor 55 and the rear end of the loading and unloading conveyor 56. The shape of the inflation conveyor track may vary, but as shown in Figure 7 is oblate.

As shown in Figure 8, the inflation conveyor 57 may extend over two of the mold carrying conveyors at right angles to each other, it being in the present instance over the end conveyor 58 between the forward end of the work conveyor 59 and the rear end of the loading and unloading conveyor 60 and also the rear portion of the latter conveyor. The inflation conveyor track in this instance is substantially triangular.

In the conveyor system shown in Figure 9, the inflation conveyor 61 may be circular in shape and located to extend over the forward end of the work conveyor 62, the rear end of the loading and unloading conveyor 63 and the end conveyor 64 connecting these two conveyors.

With these modified conveying systems, the lengths of the feeder hose lines are decreased and as a consequence counter weights or other means for holding the extended hose feeder lines at suitable elevations may be omitted if found convenient or if desired.

From the above description, it will be readily seen that I have provided a conveying system for carrying molds from and to a heater, for separating the molds during one portion of their transit in order to permit of removal of the cured tires and insertion of the soft or green tires with their expansible cores, and for inflating the cores after the bolting up operation during a succeeding portion of the mold transit, whereby the conveying apparatus may move continuously and at a substantially constant rate. Furthermore, with this arrangement, the production is very greatly increased and the length of the conveying apparatus is greatly decreased thereby saving a great deal of room.

What I claim as my invention is:

1. The combination with means for continuously advancing molds having expansible chambers, of means for inflating said chambers during a portion of the travel of said molds.

2. The combination with a continuously moving conveyor for carrying sectional molds having expansible cores, of means for inflating said cores during a portion of the travel of said molds.

3. The combination with a conveyor for advancing molds, of a second conveyor moving at substantially the same rate of speed as said first-mentioned conveyor, and means carried by said second conveyor for inflating portions of the molds.

4. The combination with a continuously moving conveyor for advancing molds, having expansible chambers, of a second continuously moving conveyor advancing in timed relation to said first-mentioned conveyor, and means carried by said second-mentioned conveyor for inflating the chambers of the molds during a portion of their travel.

5. The combination with a continuously moving conveyor for advancing molds having expansible cores, of a second continuously moving conveyor having a portion moving substantially parallel to a portion of said first-mentioned conveyor and in timed relation thereto, and means carried by said second-mentioned conveyor and adapted to be connected to said cores for inflating the latter during a portion of the travel of said molds.

6. The combination with a conveyor for carrying molds having expansible cores, of a fluid conveying main moving with said conveyor, and conductors connected to said main and adapted to be detachably connected to said molds.

7. The combination with a continuously moving conveyor for carrying sectional molds having expansible cores, of a continuously moving hose main and depending hose conductors adapted to be detachably connected to said cores, and means for moving said hose main in timed relation to said conveyor.

8. The combination with a continuously moving conveyor for carrying sectional molds, of a second continuously moving conveyor, fluid conveying means carried by said second conveyor and adapted to be connected to said molds, and means for connecting said fluid conveying means to a stationary source of fluid supply.

9. The combination with a continuously moving conveyor for carrying molds, of a second continuously moving conveyor, a flexible fluid conveying main carried upon said second conveyor, depending flexible conductors connecting into said main and adapted to be connected to said molds, a flexible feeder connected to said main, a rotatable pipe section connected to said feeder, and means for rotating said pipe section in timed relation to said second conveyor.

10. The combination with a continuously moving conveyor for carrying molds, of a second continuously moving conveyor, a hose main carried upon said second conveyor, depending hose conductors connecting into said hose main and adapted to be connected to said molds, a hose feeder connected to said hose main, a pipe section connected to said hose feeder, and means for limiting the downward movement of said hose feeder.

11. In the method of manipulating molds in the manufacture of molded articles, the continuous advancement of the molds and the inflation of portions thereof during their continuous advancement.

12. In the method of manipulating sectional molds having expansible cores in the manufacture of molded articles, the continuous conveying of the molds in series, the emptying and refilling of the molds during a portion of their travel, and the inflation of the cores during a succeeding portion of their travel.

13. The method of manipulating molds in the manufacture of molded articles, comprising the continuous advancement of molds having expansible chambers away from and returning to a station, the emptying and refilling of the molds during transit, the inflation of the chambers of the molds during transit, the subjecting of the molds to treatment at the station.

14. The method of manipulating molds in the manufacture of molded articles, comprising the continuous advancement of sectional molds having expansible cores away from and returning to a station, the emptying and refilling of the molds during a portion of their transit, the inflating of the cores during a succeeding portion of their transit, and the treating of the molds at the station.

15. The method of manipulating molds in the manufacture of molded articles comprising simultaneously subjecting a plurality of filled molds to treatment at a station, continuously advancing the molds successively from said station through an orbit returning to said station, emptying and refilling the molds during transit, and inflating portions of the molds during transit.

16. The method of manipulating molds in the manufacture of molded articles, comprising subjecting a plurality of filled molds having expansible chambers to simultaneous treatment at a station for a variable time interval, continuously advancing the treated molds successively in timed movement through an orbit leading away from and returning to the station, emptying, cleaning and re-filling the molds during transit and inflating the chambers of the refilled molds during transit.

17. The method of manipulating sectional molds, in the manufacture of molded articles comprising the continuous advancement of sectional molds from and to a station, the molds having expansible hollow sections separating the sections of the molds during a portion of their transit and returning the separated sections into re-engagement, emptying and refilling the molds while the sections thereof are separated, inflating the hollow sections of the refilled molds during a succeeding portion of their transit, and subjecting the molds with inflated sections to treatment at the station.

In testimony whereof I affix my signature.

JESSE E. McBRIDE.